United States Patent
Wu (10) Patent No.: US 6,442,266 B1
(45) Date of Patent: Aug. 27, 2002

(54) TELEPHONE SYSTEM WITH CALL FORWARDING APPARATUS AND METHOD

(75) Inventor: Woody D. Wu, Plano, TX (US)

(73) Assignee: Ericsson Inc., Plano, TX (US)

( * ) Notice: Subject to any disclaimer, the term of this patent is extended or adjusted under 35 U.S.C. 154(b) by 86 days.

(21) Appl. No.: 08/926,548

(22) Filed: Sep. 10, 1997

(51) Int. Cl.[7] ............................................... H04M 3/54
(52) U.S. Cl. ............. 379/211.02; 379/196; 379/201.02
(58) Field of Search ................................. 379/188, 196, 379/197, 198, 199, 211, 212, 201.01, 201.02, 211.02, 212.01

(56) References Cited

U.S. PATENT DOCUMENTS

| | | | |
|---|---|---|---|
| 4,277,649 A | * 7/1981 | Sheinbein | 379/211.02 |
| 4,809,321 A | 2/1989 | Morganstein et al. | 379/209.01 |
| 5,818,920 A | * 10/1998 | Rignell et al. | 379/211.02 |

FOREIGN PATENT DOCUMENTS

| | | | |
|---|---|---|---|
| DE | 43 30 755 | 3/1995 | ............ H04M/3/54 |
| WO | 83 03510 | 10/1983 | ............ H04M/3/50 |

OTHER PUBLICATIONS

Method For Informing Callers Of Forwarded Telephone IBM Technical Disclosure Bulletin, vol. 36, No. 10, Oct. 1, 1993, p. 353 XP000412288.

International Search Report; J Cremer; Dec. 14, 1998—3 pages.

* cited by examiner

Primary Examiner—Harry S. Hong (57) ABSTRACT

An adaptive call forwarding system for a telephonic system providing for selectively inhibiting call forwarding of calls sent from a calling telephonic station and received at a called telephonic station to a selected remote telephonic station. Automatic identification of the number of a calling telephonic station is provided with automatic inhibiting of call forwarding for an identified calling station. A preselected enable signal, if not inhibited from the calling telephonic station during a preselected time period results in the call being forwarded to the selected remote telephonic station.

21 Claims, 6 Drawing Sheets

TELEPHONE SYSTEM WITH CALL FORWARDING APPARATUS AND METHOD

BACKGROUND OF THE INVENTION

The present invention relates to a telephonic system and, more particularly, to such a telephonic system with adaptive call forwarding apparatus and methods.

Currently, conventional call forwarding apparatus in telephonic systems in which calls are forwarded from one telephonic station to another is known. As used herein, a telephonic station is defined as any telephone, computer or other device capable of receiving, transmitting, or processing telephonic signals in a telephonic system. Typically, activation of the call forwarding feature is established solely at the forwarding, or called, telephonic station by pressing specified keys of the telephone in a prescribed sequence. Activation includes the step of inputting the telephone number of the forwarded call receiving, or remote telephonic station to which the calls are to be forwarded. Once the call forwarding feature is active, such call forwarding is automatic. Calls to the called or forwarding telephonic station, by any and all qualified calling telephonic stations of any and all calling parties are automatically and reliably forwarded.

In addition to consistently and reliably forwarding all qualified incoming calls to the called telephonic station to the preselected forwarded call receiving station, in the prior art systems an attempt is made and achieved to effect this call forwarding in a seamless manner which is transparent to the calling party at the calling telephonic station. Delay caused by the forwarding is avoided and purposely no notification is given to the calling party that the call is being forwarded. Thus, in known systems, once call forwarding is activated, the call forwarding of all calls proceeds automatically without any choice or awareness by the calling party at the calling telephonic station.

SUMMARY OF THE INVENTION

Accordingly, there is a need for a telephonic system with an adaptive call forwarding apparatus and method to allow a choice for a calling party to selectively inhibit a call forward feature. In accordance with the telephonic system of the present invention, this need is met by provision of adaptive call forwarding apparatus and method for selectively forwarding to a selected remote telephonic station calls from a calling telephonic station and directed to a called telephonic station of the system dependent on information received from the calling telephonic station which is selectively sent by the calling telephonic station.

In the preferred embodiment call forwarding is inhibited in response to an inhibit signal manually selectively sent from the calling telephonic station. The calling station is provided with a special adaptive call forwarding available signal to indicate that call forwarding can be selectively inhibited by the caller. A preselected time delay period is provided, and if a forward inhibit signal is not manually entered within the preselected time delay period, a call from the calling telephonic station is automatically forwarded. If a forward enable signal is selectively sent by the calling station, the call is forwarded before the end of the time delay period.

In accordance with another aspect of the invention, before selective call forwarding is made available to the calling party, the telephone number of the calling telephonic station is automatically compared to a list of stored telephone numbers, and if the number of the calling telephonic station matches a number on the list, the forwarding of a call from the calling telephonic station is automatically inhibited, and the selected call forwarding is bypassed.

These and other features and advantages of the present invention are made apparent from the following detailed description, the accompanying drawings and the appended claims.

DETAILED DESCRIPTION OF THE INVENTION

Figure 1:
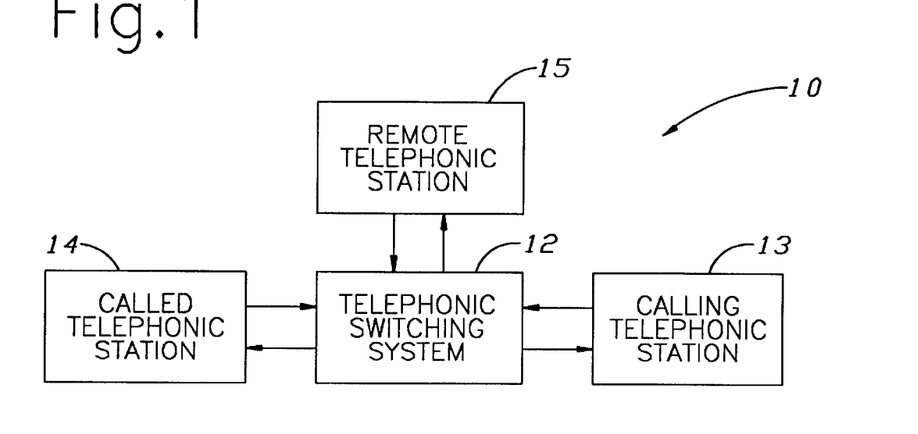
FIG. 1 is a functional block diagram of a telephonic system which includes the adaptive call forwarding apparatus of the present invention.
Figure 2:
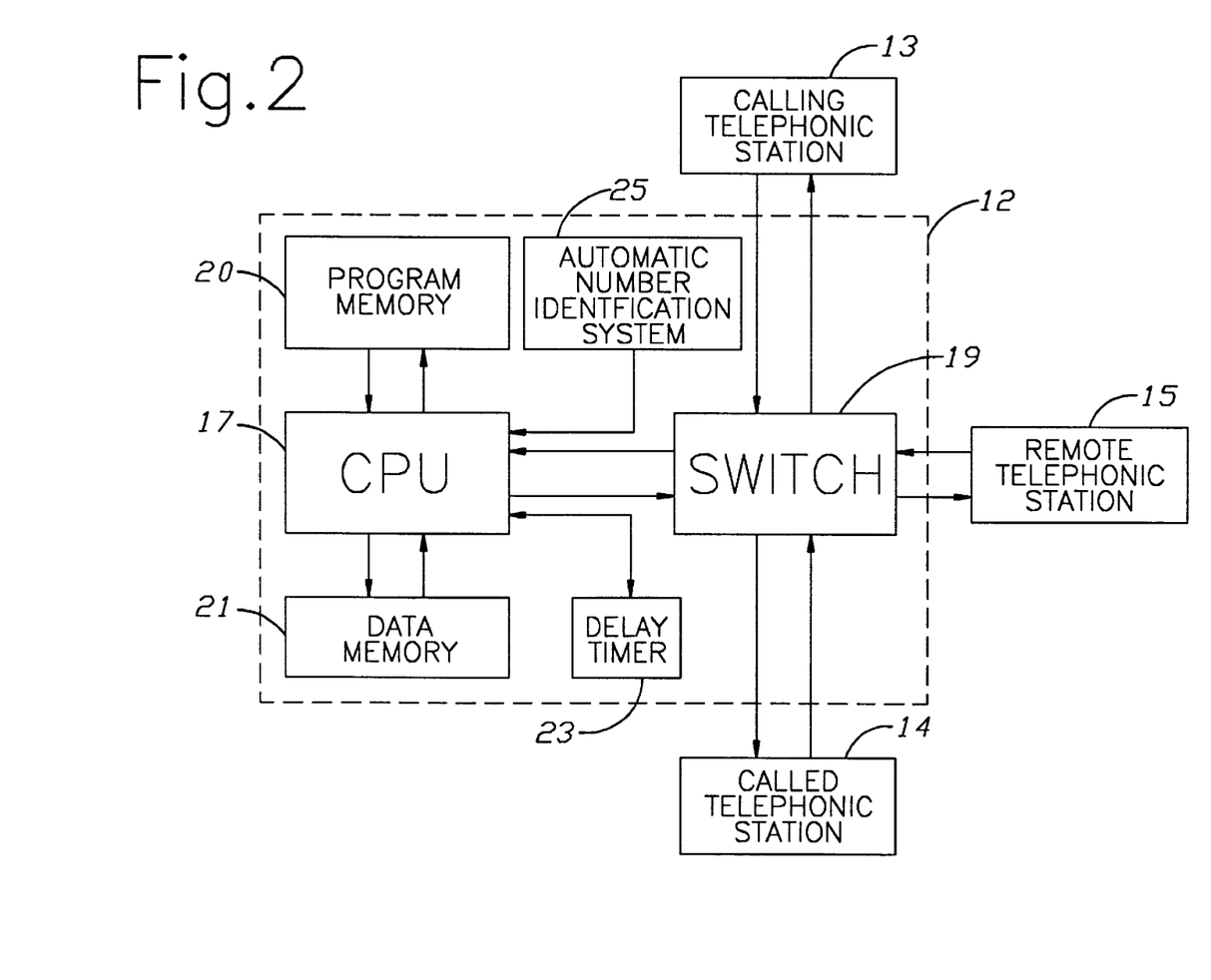
FIG. 2 is a more detailed functional block diagram of the telephonic switching system of FIG. 1.

In FIG. 1 there is shown a telephonic system 10 constructed in accordance with the invention. The telephonic system 10 includes a telephonic switching system 12 which is connected to a plurality of telephonic stations of which are shown, only a calling telephonic station 13, a called telephonic station 14 and a remote telephonic station 15. A functional block diagram of the telephonic switching system 12 is shown in FIG. 2 which includes a central processing unit, or CPU, 17 controlling a switch 19 in accordance with software stored in a program memory 20 and data stored in a data memory 21. A delay timer 23 and a conventional automatic number identification system 25 also interface with the CPU 17.

Sometimes, the automatic transfer of a call placed to the called telephonic station 14 by the calling telephonic station 13 is undesirable because users at either or both the calling telephonic station 13 or telephonic station 14 desire to maintain certain calls private and confidential. Furthermore, a user at the calling station 13 may not want to have the phone number of the calling station 13 identified at the remote telephonic station 15 if the automatic number identification system 25 is employed at the remote telephonic station 15.

In order to use the adaptive call forwarding apparatus of the present invention, the selective call forwarding feature is first activated at the called telephonic station 14. The adaptive call forwarding feature is activated by the called telephonic station 14 by actuating the appropriate keys on a telephone keypad, a keyboard of a computer or the like in a prescribed sequence call forwarding activation along with the telephone number of a remote telephonic station 15 to which calls are to be selectively transferred. Under this arrangement, calls made at a qualified calling telephonic station 13 to the called telephonic station 14 are selectively forwarded to the remote telephonic station 15.

In accordance with the invention, both the calling party and the called party have selective control over forwarding. If the called party wishes to exclude forwarding of calls from preselected calling stations, the telephone numbers to be excluded are selectively stored in data memory 21 in association with the called telephonic station 14. Calls from these preselected stored numbers are automatically precluded from forwarding. If a call from a calling telephonic station is not automatically excluded, then control over the selection process passes to the calling telephonic station, and the calling telephonic station is enabled to block or prevent forwarding by sending an appropriate selective forwarding inhibit signal. In both cases, call forwarding is inhibited based on information obtained from the calling telephonic station.

Figure 3:
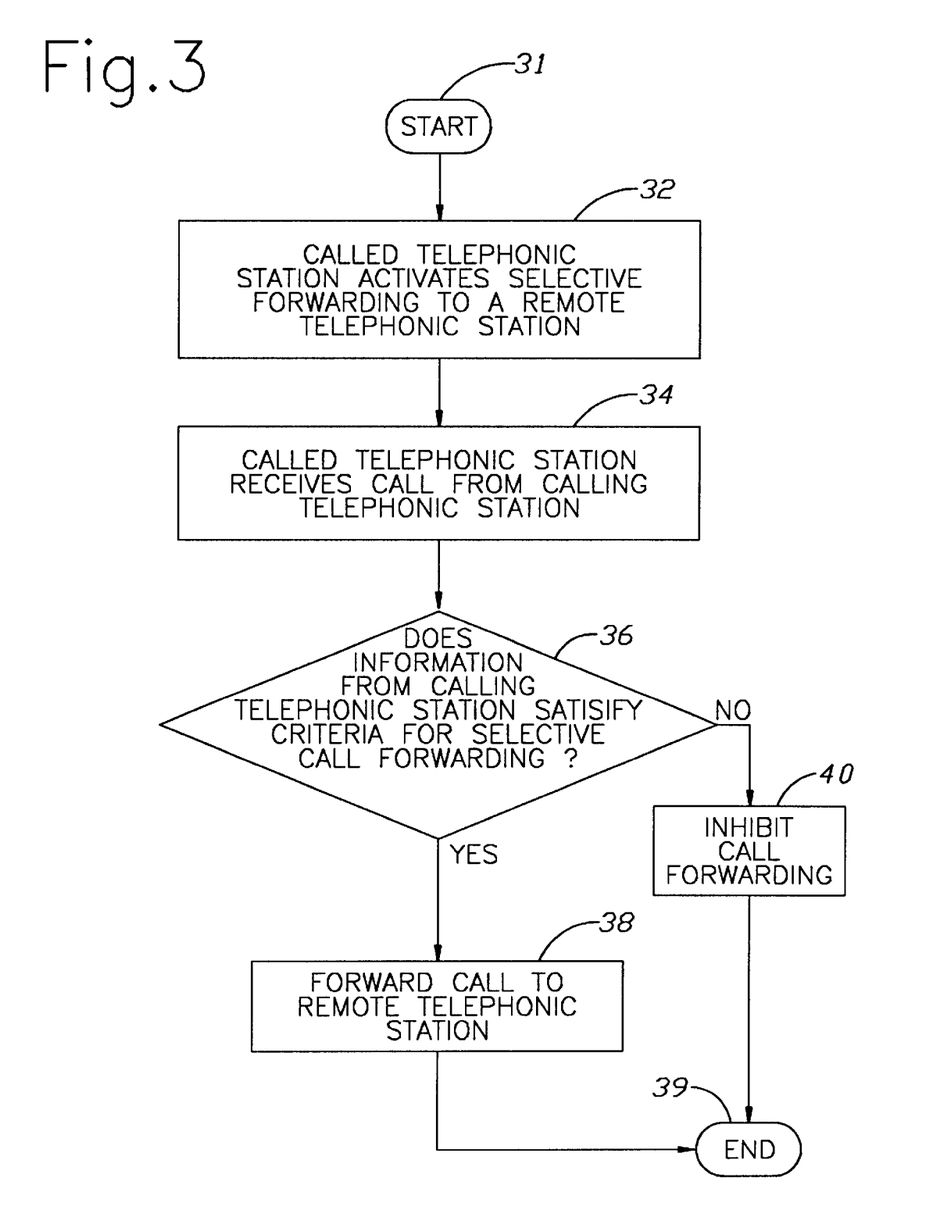
FIG. 3 is a general flow chart of the method of the call forwarding apparatus and method of FIG. 1.

Referring to the general flow chart of FIG. 3, the method of the present invention begins at the start step 31. In step 32, the called telephonic station is programmed to activate selective calls forwarding to the remote telephonic station 15. In step 34, the called telephonic station 14 receives a call from a calling telephonic station 13. Information is both automatically and selectively manually supplied by the calling telephonic station 13 and checked at step 36 to determine if the information satisfies the criteria for actuating calls forwarding. If the criteria is satisfied, at step 38 the call is transferred by the switch 19 to the remote telephonic station 15, and the method ends at step 39. If the criteria is not satisfied, then the call is not transferred at step 40, and the method ends at step 39. The criteria for calls forwarding at step 36 includes a combination of look up tables and interactive signal communication.

Figure 4:
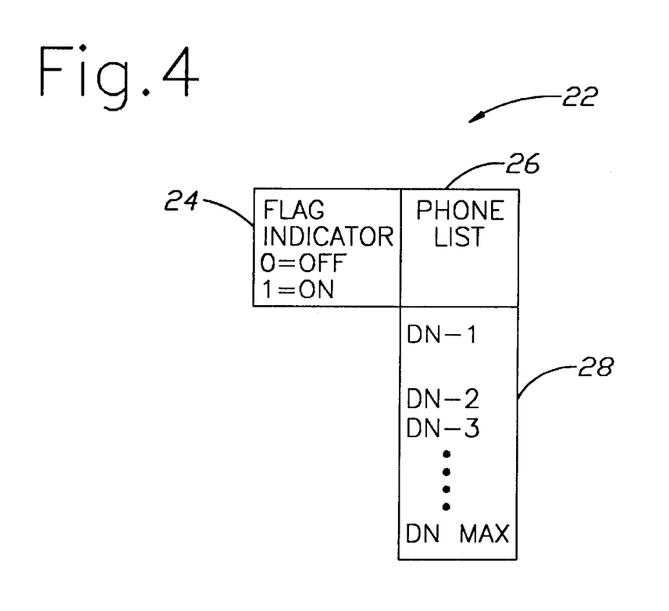
FIG. 4 is an illustration of a look up table of a list of telephone numbers stored in the data memory block of the telephonic switching system of FIG. 2 to be automatically excluded from forwarding.

Referring to FIG. 4, in accordance with the one aspect of the invention look up table 22 is provided. As part of the activation process step 32, the telephone numbers of the calling stations that are to be automatically excluded from forwarding in response to automatic number identification signals from the calling station are stored in the data memory 21. A flag indicator 24 is turned on to indicate automatic exclusion of the stored numbers from call forwarding. If the flag indicator 24 is on, the CPU 17 compares the telephone number of the calling telephonic station 13 as indicated by the automatic number identification system 25 to determine if there is a match. If there is a match, the calling telephonic station does not satisfy the criteria for forwarding in step 36, and the call is not forwarded. The flag indicator 24 is activated by a code such as 0=OFF and 1=ON to indicate whether the look-up table 22 is in operation. The look up table 22 includes a phone list 26, associated with the called telephonic station 14, having a plurality of telephone numbers 28, such as DN-1, DN-2 . . . DN-MAX which are predefined at the called telephonic station 14. The telephone numbers 28 are the numbers of the calling telephonic stations from which the calls will not be forwarded to the remote telephonic station 15. The operation of the look up table 22 is provided by the CPU 17 and the program memory 20 with the telephone numbers 28 station phone numbers in the phone list 26 stored at the data memory 21 being compared with the numbers from the automatic number identification system 25.

When the flag indicator 24 is ON, the telephone switching system 12 compares the telephone number of the calling telephonic station 13 with telephone numbers 28 contained in the phone list 26. The calls forwarding of the adaptive call forwarding system will be automatically inhibited, and the call will not be forwarded if the telephone number from the calling telephonic station 13 matches a telephone number in the phone list 26. Thus, the transfer of a call from the calling telephonic station 13 is prevented by automatic number identification information automatically supplied by the calling telephonic station 13 to the called telephonic station 14.

If the number of the calling telephonic station is not on the phone list 26 or if the flag indicator 24 is off, control of the forwarding process is passed to the calling telephonic station. In that event, in one embodiment, a selective call forwarding available signal is sent by the CPU 17 through switch 19 to the calling telephonic station 13 to indicate to the calling telephonic station 13 that selective call forwarding is available.

Preferably, the signal sent has a predefined frequency of 440 Hz with a repetitive pattern of 0.5 seconds on, 0.2 seconds off, 0.3 seconds on, 3.0 seconds off, 0.5 seconds on, 0.2 seconds off, and 0.3 seconds on, with the pattern repeating thereafter. The selective call forwarding available signal contains throughout a preselected time delay period established by delay timer 23. The forwarding inhibit signal is selectively generated at the calling telephonic station 13, for example, by means of a key stroke on a telephone keypad or the keyboard of a computer. Inputting the forwarding inhibit signal results in inhibiting the call forwarding means of the CPU 17 from forwarding the call. If the calling telephonic station 13 does not transmit any specified signals to the telephonic switching system 12 directed to the called telephonic station 14 within a preselected time delay period, forwarding does not occur until after the end of the time delay period. On the other hand, if a call forwarding enable signal is sent from the calling telephonic station, the delay timer is reset, and the call is immediately forwarded.

Alternatively in another embodiment, an interactive voice announcement with prompts is provided. In this embodiment, the calling telephonic station 13 receives from the telephone switching system 12 and inhibited at the called telephonic station 14 a voice menu of specified signals to selectively send for enabling call forwarding or inhibiting call forwarding of the call originated at the calling telephonic station 13. As noted, the call forwarding proceeds at the end of the time delay period if the calling station 13 does not transmit any signal to the telephone switching system 12 directed to the called telephonic station 14 within a preselected time delay.

Thus, the call forwarding from the called telephonic station 14 is enabled or inhibited by information manually supplied by the calling telephonic station 13. The information manually supplied is either the forwarding inhibit, the forwarding enable signal or remaining on line without entering a signal and allowing the delay timer to automatically enable the calls forwarding means to automatically forward the call to the remote telephonic station 15.

Figure 5A:
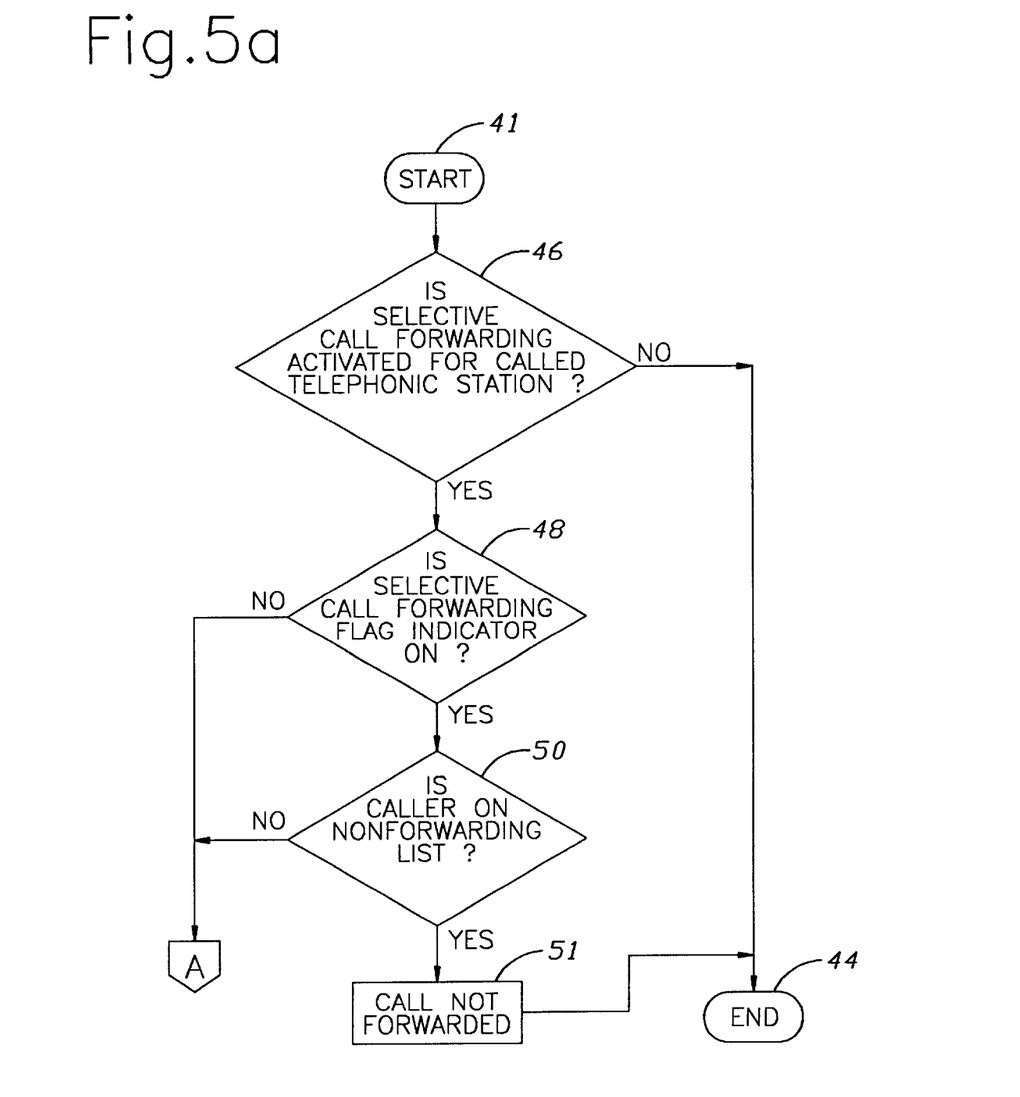
FIGS. 5a, 5b and 5c are detailed flow charts of the preferred method of operation of the adaptive call forwarding apparatus shown generally in FIG. 4.
Figure 5B:
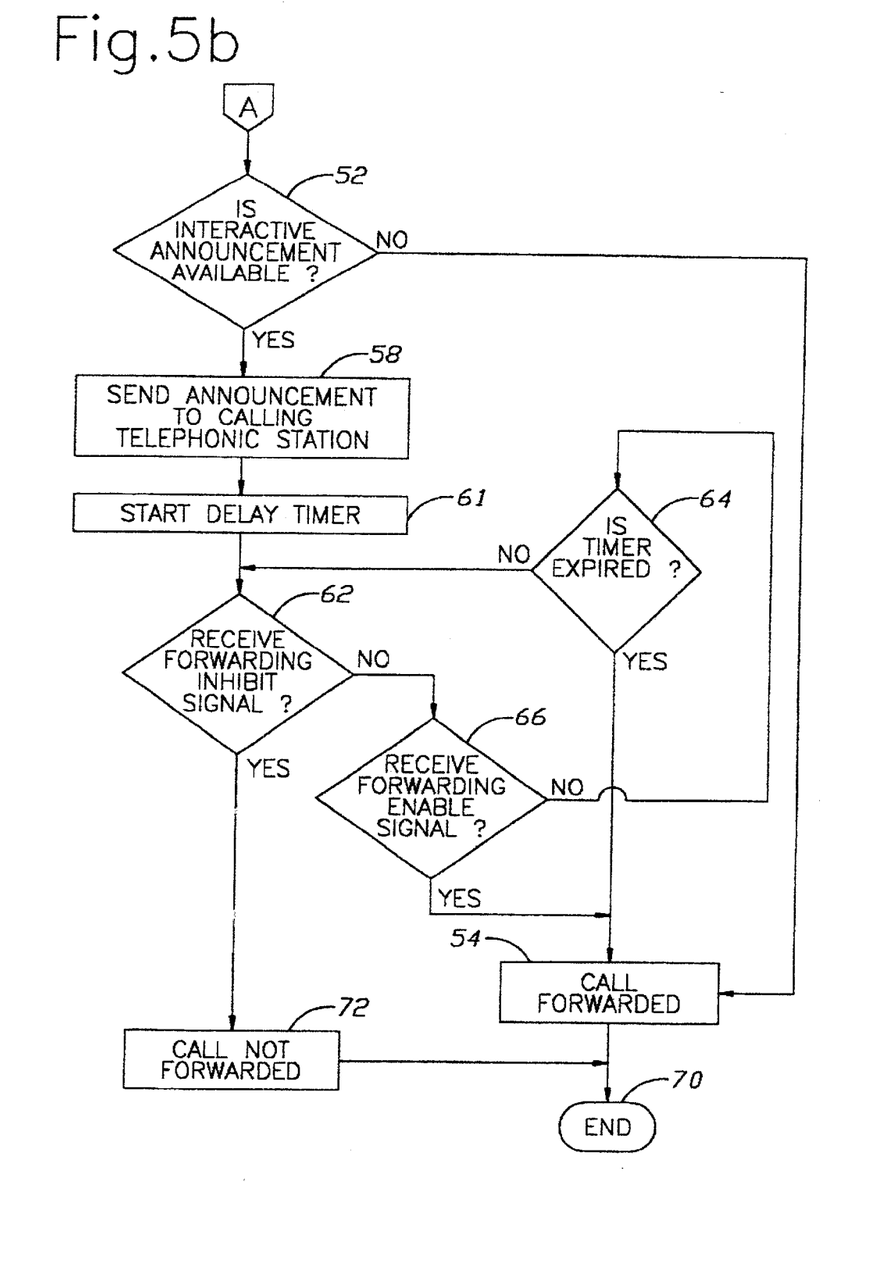
Figure 5C:
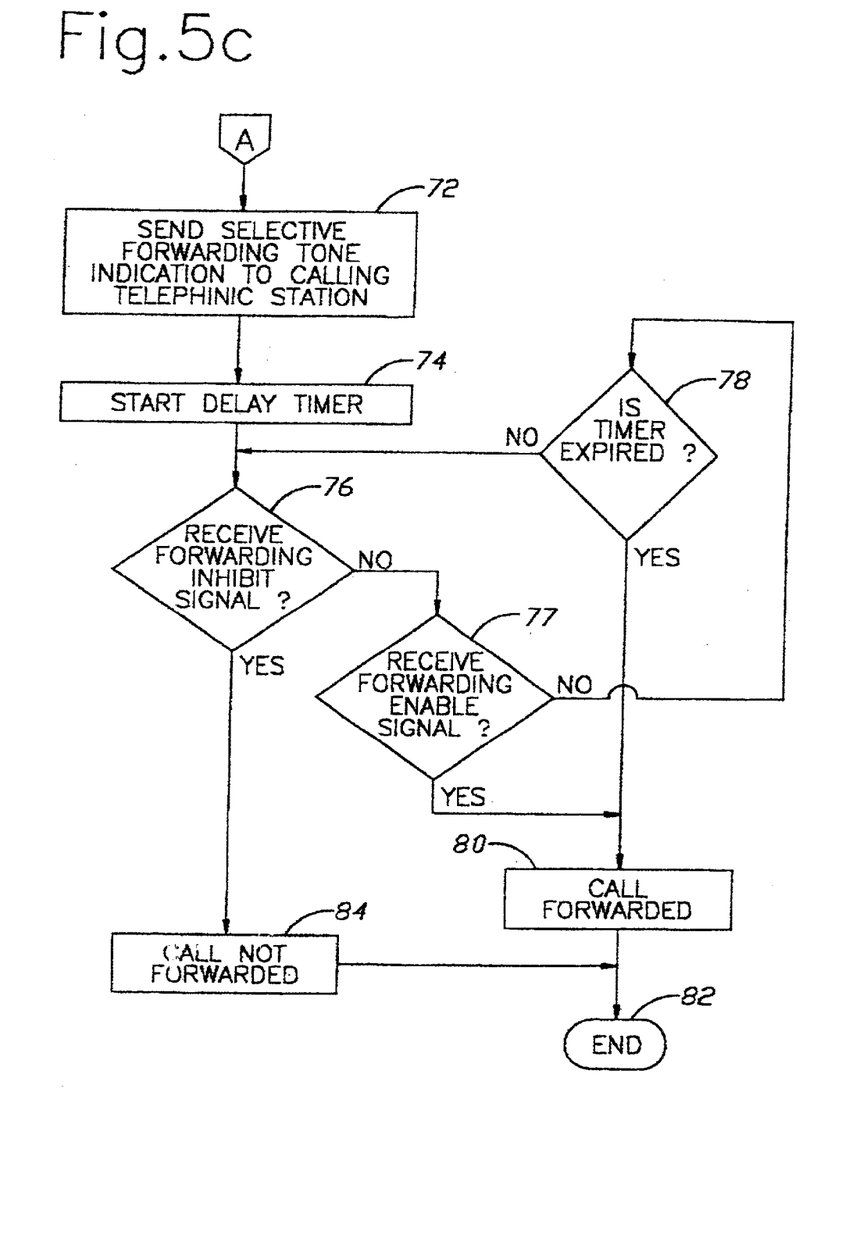

A more detailed flow chart of the alternative methods is shown in FIGS. 5a, 5b and FIGS. 5a and 5c. The method starts at step 41. Next, at step 46, it is determined whether the selective call forwarding is activated for the called telephonic station. if not activated, the method proceeds to the end of the method at step 44 and there is no forwarding. If activated, then at step 48 it is determined whether the selective calls forwarding indicator flag 24 is on. If not on, the method proceeds to step 52 of FIG. 5b in the case of one embodiment with interactive announcements and to step 72 of FIG. 5c, in the case of the tone or non-interactive announcement embodiment, as described below. In either case, if the calls forwarding indicator flag 24 is on, then at step 50 it is determined whether the caller's telephone number is on the list of telephone numbers. If the caller's telephone number is not on the phone list 28, then the method proceeds to either step 52 of FIG. 5b in one case and to step 72 of FIG. 5c in the other case. If the caller's telephone number is on the phone list 28, the method proceeds to step 51, and the caller will not be forwarded. The method ends at step 44.

Referring to FIG. 5b, in the embodiment of the adaptive calls forwarding system of the present invention which uses interactive announcements in combination with the look up table 22, a determination is made at step 52 whether an interactive announcement is available. If not available, in step 54 the call is forwarded and the method ends at step 70. If an announcement is available, then at step 58 a voice announcement with prompts is sent to the calling telephonic station 13 to indicate how to send either call forwarding inhibit signal or a call forwarding enable signal. At the same time, the delay timer is started at step 61.

Next, at steps 62 and 66, it is determined whether a call forward inhibit or a call forward enable selection has been made by the calling telephonic station 13 and received at the telephone switching system 12. Until a signal is received, the time is checked for lapse of the time delay at step 64. If the timer has lapsed, then the call is automatically forwarded at step 54, and the method ends at step 70. If a forwarding inhibit signal is received at step 62 before lapse of the time delay period, the method proceeds to step 72, and the call is not forwarded and the method ends at step 70. If the forward enable signal is received in step 66, in step 54 the call is forwarded immediately, and the method ends at step 70.

Referring to FIG. 5c, alternatively, upon completion of the method described in FIG. 5a and when the phone number on the calling telephonic station 13 is not on the phone list 26, the tone or non-interactive announcement embodiment is employed at step 72 with the sending of a selective forwarding enable signal from the CPU 17 to the calling telephonic station 13. At step 74, the delay timer is set for a preselected time delay period. At step 76, it is determined if a forwarding inhibit signal has been received. If not, in step 77, it is determined if the forwarding enable signal has been received. If not, in step 78 it is determined if the preselected time delay of the delay timer has expired. If the preselected time delay has expired, in step 80 the call is forwarded, and the method ends at step 82. If a forwarding inhibit signal is received at step 76, at step 84 the call is not forwarded. If a forwarding enable signal is received in step 77, the call is forwarded at step 80, and the method ends at step 82.

Thus, in accordance with the present invention, the call forwarding of a call is enabled or inhibited based on information supplied by a calling telephonic station 13 to the telephone switching system 12 directed to the called telephonic station 14, or in conjunction with information supplied by the called telephonic station 14 to the telephone switching system 12 directed to the calling telephonic station 13. Accordingly, the privacy of the called telephonic station 14 and the calling telephonic station 13 is achieved with the adaptive calls forwarding system in accordance with the present invention.

Those skilled in the art who now have the benefit of the present disclosure will appreciate that the present invention may take many forms and embodiments. Some embodiments have been presented and described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. In a telephonic system of interconnectable telephonic stations, an adaptive call forwarding apparatus, comprising:

means for forwarding to a selected remote telephonic station calls from a calling telephonic station and directed to a called telephonic station for receipt, if not inhibited;

means for automatically inhibiting the calls forwarding means from forwarding of calls directed to the called telephonic station from preselected calling telephonic stations; and means for selectively inhibiting the calls forwarding means from forwarding calls directed to the called telephonic station from calling telephonic stations other than the preselected calling telephonic stations.

2. The telephonic system as recited in claim 1 in which the automatically inhibiting means includes means for storage of a list of preselected telephone numbers, means for receiving automatic number identification signals representative of telephone numbers of the calling telephonic stations, means for the comparing telephone numbers represented by the automatic number identification signals when received with the list of preselected telephone numbers to determine if there is a match, and means responsive to said comparing means for inhibiting said calls forwarding means from forwarding a call if there is a match.

3. The telephonic system as recited in claim 2 in which the selective inhibiting means includes means for sending an adaptive call forwarding available signal to calling telephonic stations for which there is not a match.

4. The telephonic system as recited in claim 3 in which said selective inhibiting means includes means responsive to a receipt of a selective forwarding inhibit signal selectively sent from the calling telephonic station to inhibit the calls forwarding only when the adaptive call forwarding signal is being sent.

5. The telephonic system as recited claim 4 in which said adaptive calls forwarding system includes a timer for establishing a preselected time delay period to allow selective inhibiting, and said calls forwarding means forwards the call if no selective inhibit signal is received during said time delay period.

6. The telephonic system as recited in claim 1 in which the selectively inhibiting means includes means for selectively inhibiting the calls forwarding means in response to receipt of a selective forwarding inhibit signal sent by a calling telephonic station other than the preselected telephonic station when the calling telephonic station is actuated.

7. The system as recited in claim 1 includes the selective inhibiting means includes a delay timer, means for starting the delay timer only in response to a call from other than said preselected telephonic stations, means for inhibiting the calls transferring means during a time delay period established by the timer unless a call transfer enable signal is received, and means for sending a call transfer enable signal from the calling telephonic stations.

8. In a telephonic system of interconnectable telephonic stations, a method for adaptive call forwarding, comprising the steps of forwarding calls to a selected remote telephonic station from a calling telephonic station and directed to a called telephonic station if not inhibited;

automatically inhibiting a call forwarding means from forwarding of calls directed to the called telephonic station from preselected calling telephonic stations; and selectively inhibiting the call forwarding means from forwarding calls directed to the called telephonic station from calling telephonic stations other than the preselected calling telephonic stations.

9. The method as recited in claim 8 including the steps of storing of a list of preselected telephone numbers, receiving automatic identification signals representative of telephone numbers of calling telephonic stations, comparing telephone numbers represented by the received automatic number identification signals with the list of preselected telephone numbers to determine if there is a match, and responding to said comparing means for inhibiting said call forwarding means from forwarding a call if there is a match.

10. The method as recited in claim 9 including the step of sending an adaptive call forwarding available signal to calling telephonic stations for which there is not a match.

11. The method as recited in claim 10 includes the step of responding to receipt of selective inhibit signal selectively sent from the calling telephonic station to inhibit the calls forwarding only when the adaptive call forwarding available signal is being sent.

12. The method of claim 11 including the steps of establishing a preselected time delay period to allow selective inhibiting, and forwarding the call if no selective inhibit signal is received during said time delay period.

13. The method of claim 8 including the step of selectively inhibiting the call forwarding means in response to receipt of a selective inhibit signal sent by a calling telephonic station other than the preselected telephonic station when the calling telephonic station is manually actuated.

14. The method of claim 8 including the steps of starting a delay timer only in response to a call from other than said preselected telephonic stations, inhibiting the call transferring means during a time delay period established by the timer unless a call transfer enable signal is received, and sending a call transfer enable signal from the calling telephonic stations.

15. A system for forwarding incoming calls within a telecommunications system, comprising:

a data memory for storing one or more telephone numbers for a particular called telephonic station;

a processor for automatically forwarding incoming call connections directed to said called telephonic station to a preselected forward-to-station;

in response to an incoming call connection from a particular calling telephonic station and directed to said called telephonic station, a comparator for comparing a telephone number associated with said calling telephonic station with said stored telephone numbers and automatically inhibiting said processor from forwarding said incoming call connection if there exists a match; and means for selectively inhibiting said processor from forwarding calls directed to the called telephonic station from calling telephonic stations other than the stored telephone numbers.

16. The system of claim 15 further comprising a register storing a value inhibiting said processor from forwarding all incoming call connections directed to said called telephonic station.

17. The system of claim 15 further comprising a timer for establishing a preselected time delay period during which said processor requests a call forwarding inhibiting instruction from said calling telephonic station and wherein said processor automatically forwarding said incoming call connection after the end of said time delay unless said call forwarding inhibiting instruction is received.

18. The system of claim 17 further comprising an interactive announcement device for providing said calling telephonic station with a prerecorded interactive announcement with prompts indicating how to selectively send said call forwarding inhibiting instruction.

19. A method of forwarding incoming call connections within a telecommunications network, comprising the steps of:

storing one or more telephone numbers for a particular called telephonic station;

receiving an incoming call connection from a particular calling telephonic station directed to said called telephonic station;

comparing a telephone number associated with said calling telephonic station with said stored telephone numbers; and forwarding said incoming call connection to a preselected forward-to-station in response to a determination that said telephone number associated with said calling telephonic station does not match one of said stored telephone numbers.

20. A method of claim 19 wherein in response to said determination that said telephone number associated with said calling telephonic station does not match one of said stored telephone number, further comprising the steps of:

establishing a timer for a preselected time period;

requesting a call forwarding inhibiting instruction to said calling telephonic station; and forwarding said incoming call connection to said forward-to-station after the end of said time period unless said requested call forwarding inhibiting instruction is received.

21. A method of claim 20 further comprising the step of providing said calling telephonic station with a prerecorded interactive announcement with prompts indicating how to selectively send said call forwarding inhibiting instruction.

\* \* \* \* \*